(12) United States Patent
Yamaguchi et al.

(10) Patent No.: US 7,530,647 B2
(45) Date of Patent: May 12, 2009

(54) VEHICULAR BRAKE DEVICE

(75) Inventors: Takahiro Yamaguchi, Kariya (JP); Takeshi Fuchida, Kariya (JP); Shigeki Torii, Anjo (JP); Takashi Sato, Okazaki (JP); Hidemi Ikai, Kariya (JP); Yukio Ishikawa, Hekinan (JP); Hiroyuki Shinkai, Obu (JP)

(73) Assignee: Advics Co., Ltd., Aichi-pref. (JP)

( * ) Notice: Subject to any disclaimer, the term of this patent is extended or adjusted under 35 U.S.C. 154(b) by 359 days.

(21) Appl. No.: 11/589,237

(22) Filed: Oct. 30, 2006

(65) Prior Publication Data
US 2007/0096550 A1 May 3, 2007

(30) Foreign Application Priority Data

| Nov. 1, 2005 | (JP) | ............................. 2005-318438 |
| Nov. 1, 2005 | (JP) | ............................. 2005-318439 |
| Apr. 3, 2006 | (JP) | ............................. 2006-101949 |
| Apr. 3, 2006 | (JP) | ............................. 2006-101950 |
| Apr. 3, 2006 | (JP) | ............................. 2006-101951 |

(51) Int. Cl.
*B60T 8/40* (2006.01)
(52) U.S. Cl. .................... 303/116.4; 303/10; 417/410.3
(58) Field of Classification Search ............. 303/10–11, 303/116.4, DIG. 10
See application file for complete search history.

(56) References Cited

U.S. PATENT DOCUMENTS

| 6,402,266 B1 | 6/2002 | Ariki et al. |
| 7,124,930 B2 * | 10/2006 | Ariki et al. ................ 228/173.4 |
| 2005/0191189 A1 | 9/2005 | Fuchida et al. |

* cited by examiner

*Primary Examiner*—Christopher P Schwartz
(74) *Attorney, Agent, or Firm*—Posz Law Group, PLC

(57) ABSTRACT

A pump body includes a cylindrical first case for housing the plurality of rotary pumps, a second case located coaxially with the first case, and a disk spring located between the first case and the second case. In addition, a fixing means located at an entrance of the concave portion of a housing presses the second case in the insertion direction of the pump body and fixes the second case.

14 Claims, 5 Drawing Sheets

VEHICULAR BRAKE DEVICE

CROSS REFERENCE TO RELATED APPLICATION

This application is based on and incorporates herein by reference Japanese Patent applications No. 2005-318438 filed on Nov. 11, 2005, No. 2005-318439 filed on Nov. 11, 2005, No. 2006-101949 filed on Apr. 3, 2006, No. 2006-101950 filed on Apr. 3, 2006, and No. 2006-101951 filed on Apr. 3, 2006.

FIELD OF THE INVENTION

The present invention relates to a vehicular brake device that uses a rotary pump such as a trochoid pump in performing brake hydraulic control.

BACKGROUND OF THE INVENTION

Efforts have been made in recent years to reduce operation noise and the like during a brake hydraulic pressure control such as ABS control. For this purpose, a rotary pump such as a trochoid pump is used in a vehicular brake device as a pump for the brake hydraulic pressure control.

A vehicular brake device having such a rotary pump is proposed in Japanese Patent Publication No. 2001-80498. FIG. 5 is a cross sectional view of a pump body J100 of a rotary pump that is provided in the vehicular brake device described in this publication.

As shown in FIG. 5, the pump body J100 is a unit in which two rotary pumps J10 and J13, as well as a drive shaft J54 for the rotary pumps J10 and J13 and the like, are incorporated in cylindrical cases J71a to 71d, J72a, and J72b. The pump body J100 constructed as the unit is also fixed to a housing J150 of the vehicular brake device. More specifically, the pump body J100 is inserted into a concave portion J150a of the housing J150.

In this case, a strong axial force is required in order to prevent the pump body J100 from wobbling in the housing J150 because of a high brake hydraulic pressure generated by intake and discharge of brake fluid.

However, considerable variations in the axial force may occur when the above axial force is generated by thread fastening. A leaf spring J210 is located as a countermeasure against this problem at an end or base position of the pump body J100. With this countermeasure it is possible to secure and stabilize the axial force of the pump body J100. At the same time, the axial force acting on the pump body J100 is also suppressed to the required minimum without becoming excessive.

However, a length in the axial direction of the pump body J100 becomes large in order to locate the leaf spring J210 at the end or the base position. As a consequence, the pump body J100 and accordingly the vehicular brake device cannot be made sufficiently compact.

SUMMARY OF THE INVENTION

In view of the foregoing points, it is an object of the present invention to provide a vehicular brake device capable of shortening a length of a pump body constructed as a unit including a rotary pump and the like.

To achieve the above object, a pump body includes a cylindrical first case for housing the plurality of rotary pumps, a second case located coaxially with the first case, and a spring located between the first case and the second case. In addition, a fixing means located at an entrance of the concave portion of a housing presses the second case in the insertion direction of the pump body and fixes the second case.

Since the spring is located between the first case and the second case, space can be more effectively utilized, as compared to locating the spring at an end or base of the pump body. A total axial length (pump shaft length) of the pump body including the spring can thus be made shorter than when the spring mean is disposed at an end or base position of the pump body. Accordingly, it is possible to provide a vehicular brake device capable of shortening the pump length of the pump body constructed as a unit including a rotary pump and the like.

BRIEF DESCRIPTION OF THE DRAWINGS

The Invention, Together With Additional Objective, Features And Advantages Thereof, Will Be Best Understood From The Following Description, The Appended Claims And The Accompanying Drawings. In The Drawings:

DETAILED DESCRIPTION OF THE PREFERRED EMBODIMENTS

A basic configuration of the brake device according to an embodiment of the present invention will be described below with reference to FIG. 1. An internal pump (specifically, a trochoid pump) is used as a rotary pump of the brake device shown in FIG. 1. In the following description, the brake device is applied to a front-wheel-drive four-wheel vehicle having an X type hydraulic circuit which includes a first conduit system for both the front right wheel and the rear left wheel, and a second conduit system for both the front left wheel and the rear right wheel. However, the brake device may also be applied to a vehicle having a front-rear type hydraulic circuit which includes a conduit system for both the front right wheel, and the rear right wheel and another conduit system for both the front left wheel and the rear left wheel and to a vehicle having any other type of hydraulic circuit.

Figure 1:
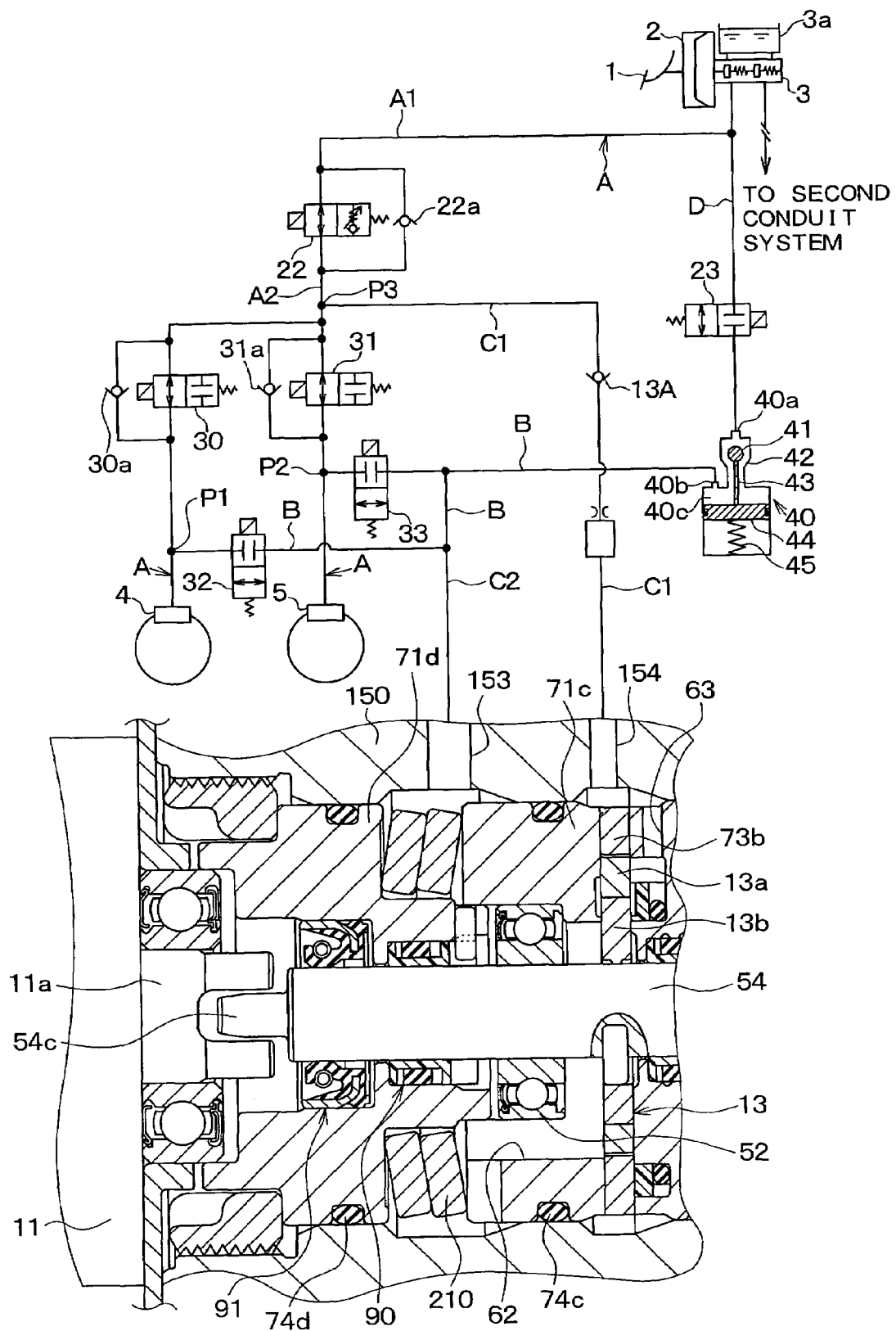
FIG. 1 is a partially cross-sectional schematic diagram showing a configuration of conduits in a vehicular brake device according to a first embodiment of the present invention.

As shown in FIG. 1, a brake pedal 1 is connected with a booster 2, which amplifies a brake pedaling force and the like.

The booster 2 includes a push rod which transmits the amplified pedaling force to a master cylinder 3. The push rod presses a master piston located in the master cylinder 3 to generate a master cylinder pressure. The brake pedal 1, the booster 2, and the master cylinder 3 correspond to an example of a brake hydraulic pressure generating means.

Connected with the master cylinder 3 is a master reservoir 3a, which provides the master cylinder 3 with brake fluid and collects excessive brake fluid in the master cylinder 3.

The master cylinder pressure is transmitted to a wheel cylinder 4 for the front right wheel and a wheel cylinder 5 for the rear left wheel, via an actuator for controlling a brake hydraulic pressure which performs ABS control or the like. Although the following description is concerned with the first conduit system for the front right wheel and the rear left wheel, it can be fully applied to the second conduit system for the front left wheel and the rear right wheel.

The brake device includes a main conduit A which is connected with the master cylinder 3. A linear differential pressure control valve 22 and a check valve 22a are located in the conduit A. The valve 22 divides the conduit A into two regions, namely, a conduit A1 and a conduit A2. The conduit A1 spans a path between the master cylinder 3 and the valve 22 and receives the master cylinder pressure. The conduit A2 spans a path between the valve 22 and the wheel cylinder 4 and a path between the valve 22 and the wheel cylinder 5.

In normal operation of the brake device, the valve 22 is set to a communicative state in which the brake hydraulic pressure is fully transmitted through the valve 22. The valve 22 is set to a differential pressure state when sudden braking is applied to the wheel cylinders 4 and 5 after the master cylinder pressure falls below a predetermined pressure, and when traction control is performed. In the differential pressure state, a predetermined difference in the brake hydraulic pressure is generated between the master cylinder side and the wheel cylinder side of the valve 22. The predetermined pressure difference for the valve 22 is linearly adjustable.

The conduit A2 branches into two paths. A first pressure increase control valve 30 is located in one of the paths and controls the brake hydraulic pressure applied to the wheel cylinder 4. A second pressure increase control valve 31 is located in the other one of the paths and controls the brake hydraulic pressure applied to the wheel cylinder 5.

The valves 30 and 31 are constructed as two-position valves each of which switches between a communicative state and a closed state based on control of an electronic control unit (hereinafter referred to as an ECU). When one of these two-position valves 30 and 31 is set to the communicative state, the master cylinder pressure (or the brake hydraulic pressure which is generated by discharged fluid from the rotary pump) can be applied to the corresponding one of the wheel cylinders 4 and 5. When one of these two-position valves 30 and 31 is set to the closed state, transmission of pressure between fluid at both sides of the one two-position valve is prohibited. The first and second pressure-increasing control valves 30 and 31 are normally set to the communicative states during normal braking operation in which ABS control is not being performed.

Safety valves 30a and 31a are located in parallel with the control valves 30 and 31, respectively. The safety valves 30a and 31a remove the brake fluid from the wheel cylinders 4 and 5, respectively, when the brake pedal 1 becomes no longer depressed and the ABS control becomes no longer performed.

A reservoir 40 is connected through an intake conduit B with a first point P1 in the conduit A between the valve 30 and the wheel cylinder 4, and with a second point P2 in the conduit A between the valve 31 and the wheel cylinder 4. In the conduit B, a pressure decrease control valve 32 is located between the reservoir 40 and the first point P1, and another pressure decrease control valve 33 is located between the reservoir 40 and the second point P2. Each of the valves 32 and 33 switchs between a communicative state and a closed state based on control of the ECU. Specifically, the valves 32 and 33 are always in the closed states during the normal braking operation in which the ABS control is not performed.

A third point located in the conduit A2 is connected with a rotary pump 13 through a reflux conduit C1. The rotary pump 13 is connected through another reflux conduit C2 and a part of the conduit B with the reservoir 40. Thus, the rotary pump 13 is located in a fluid path between the point P3 and the reservoir 40. A safety valve 13A is located in the conduit C1, in other words, at the delivery port side of the rotary pump 13, so as to keep the brake fluid from flowing backward. The rotary pump 13 is also connected with a motor 11 for driving the rotary pump 13. The second conduit system includes a rotary pump 10 (see FIG. 2) which has a structure identical to the rotary pump 13. The rotary pumps 10 and 13 will be described later in detail.

The reservoir 40 is connected with the master cylinder 3 through an auxiliary conduit D. A two-position valve 23 is disposed in the conduit D. The two-position valve 23 is set to the closed state so as to close the conduit D in the normal operation of the brake device. The two-position valve 23 is set to the communicative state and the conduit D attains the communicative state when brake assist, traction control and the like are performed. In the communicative state, the rotary pump 13 draws the brake fluid from the conduit A1 through the conduit D and discharges the brake fluid to the conduit A2. Accordingly, the wheel cylinder pressures for the wheel cylinders 4 and 5 become higher than the master cylinder pressure, thereby increasing a vehicle wheel braking force. In this case, the valve 22 maintains the pressure difference between the master cylinder pressure and the wheel cylinder pressure.

The reservoir 40 includes reservoir mouths 40a and 40b. The reservoir mouth 40a is connected with the conduit D and receives brake fluid from the master cylinder 3. The reservoir mouth 40b is connected with the conduit B and receives brake fluid escaping from the wheel cylinders 4 and 5. A ball valve 41 is located deeper in the reservoir 40 than the reservoir mouth 40a is. A rod 43 is separatably attached to the ball valve 41 and has a predetermined stroke for moving the ball valve 41 up and down.

In a reservoir chamber 40c, a piston 44 is located which moves in conjunction with the rod 43. In the reservoir chamber 40, a spring 45 is also located which generates a force to press the piston 44 toward the ball valve 41 and thereby push the brake fluid out of the reservoir chamber 40c.

When the reservoir 40 collects a predetermined amount of the brake fluid, the ball valve 41 comes to sit on a valve seat 42 and thereby prohibits the brake fluid from flowing into the reservoir 40. Therefore, the brake fluid does not flow into the reservoir chamber 40c beyond intake capacity of the rotary pump 13. Consequently, a high pressure is not applied to the intake side of the rotary pump 13.

Figure 2:
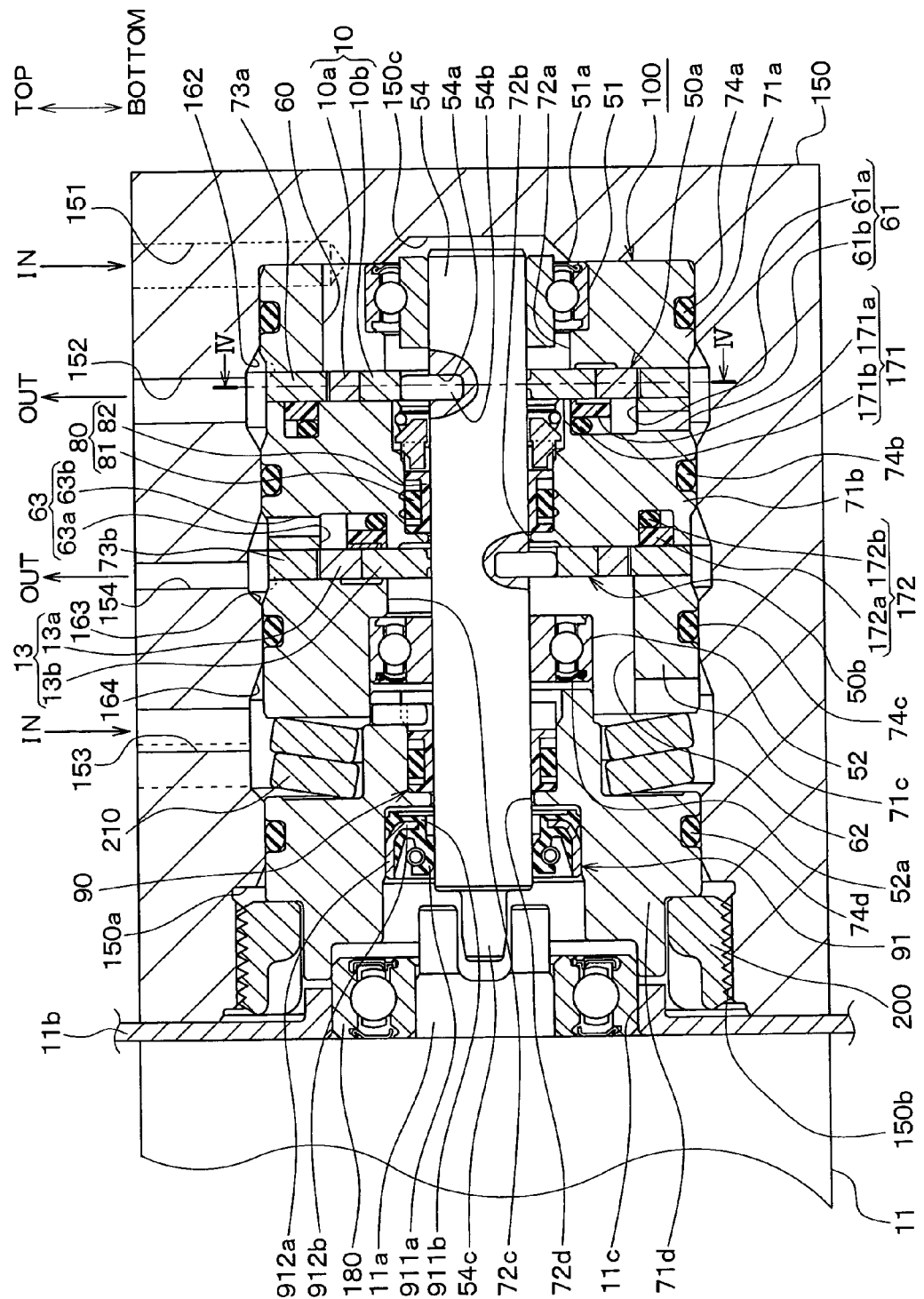
FIG. 2 is a cross-sectional view of a pump body which is in the vehicular brake device and includes rotary pumps.

In FIG. 2, the pump body 100 is attached to a housing 150 of the actuator for controlling the brake hydraulic pressure such that the vertical direction of the figure corresponds to the vertical direction of the vehicle. The overall configuration of the pump body 100 will be described below with reference to FIG. 2.

As explained above, the brake device includes two systems, namely, the first conduit system and the second conduit system. The pump body 100 includes the rotary pump 13 for the first conduit system shown in FIGS. 1 and 2 and the rotary pump 10 for the second conduit system shown in FIG. 2. The rotary pumps 10 and 13 are driven by a drive shaft 54.

A casing that forms the contour of the pump body 100 includes cylinders (or, side plates) and cylindrical center plates. The cylinders include a first cylinder 71a, a second cylinder 71b, a third cylinder 71c, and a fourth cylinder 71d. The center plates include a first center plate 73a and a second center plate 73b.

The first cylinder 71a, the first center plate 73a, the second cylinder 71b, the second center plate 73b, and the third cylinder 71c are aligned in this order and each neighboring pair of them are joined by welding at outer peripheries of two facing surfaces of the pair. These welded members 71a, 73a, 71b, 73b, and 71c form a unit that serves as a first case. A disc spring 210 which serves as a spring is inserted between the third cylinder 71c of the first case and the fourth cylinder 71d which serves as a second case. The fourth cylinder 71d is disposed coaxially with the first case. Thus, an integral structure of the pump body 100 is achieved.

The pump body 100 with the integral structure described above is inserted into a substantially cylindrical concave portion 150a which is formed on the housing 150 of the actuator for controlling the brake hydraulic pressure.

A ring-shaped external thread member 200 is screwed into an internal thread 150b formed at the entrance of the concave portion 150a, whereby the pump body 100 is fixed to the housing 150. More specifically, a second concave portion 150c with a circular shape is formed at an area in the concave portion 150a of the housing 150. The area faces an end of the drive shaft 54 which is a part of the leading end of the pump body 100 in its inserting direction. The diameter of the second concave portion 150c is larger than that of the drive shaft 54, but smaller than the outer diameter of the first cylinder 71a. An end portion of the drive shaft 54, namely, a portion projecting toward the second concave portion from an end surface of the first cylinder 71a, is set in the second concave portion 150c, while a portion other than the second concave portion 150c at the bottom of the concave portion 150a comes in touch with an end face of the first cylinder 71a. The pump body 100 thus receives an axial force when the external thread member 200 is screwed into the internal thread 150b.

In a structure for fixing the pump body 100 to the concave portion 150a of the housing 150, the disc spring 210 operates as follows.

A strong axial force must be generated in order to fix the pump body 100 to the housing 150, in other words, in order to keep the pump body 100 from wobbling in the housing 150 due to a high brake hydraulic pressure which is generated when the pump body 100 intakes and discharges the brake fluid.

However, obtaining the above axial force solely by screwing of the external thread member 200 generates considerable variations in the axial force.

To resolve this issue, in the present embodiment, the disc spring 210 is located between the third and fourth cylinders 71c and 71d. The diameter of an end portion of the fourth cylinder 71d facing the third cylinder 71c is reduced compared to the other portions of the fourth cylinder 71d. This end portion is then inserted into a third center hole 72c of the third cylinder 71c. The diameter of this end portion of the cylinder 71d inserted into the third center hole 72c is set substantially similar to or slightly smaller than the diameter of the third center hole 72c. Thus, a part of the fourth cylinder 71d loosely fits in the third center hole 72c of the third cylinder 71c.

When the external thread member 200 is screwed into the internal thread 150b, an elastic force of the disc spring 210 between the fourth cylinder 71d and the third cylinder 71c becomes an axial force sufficient for fixing the pump body 100 to the concave portion 150a of the housing 150. In other words, the axial force is generated as follows. The disc spring 210 presses members located to the right of the third cylinder 71c in FIG. 2 against the bottom surface of the concave portion 150a. The disc spring 210 also presses the fourth cylinder 71d toward the external thread member 200. As a consequence, the axial force acting on the pump is stabilized and suppressed to the required minimum. Deformation of the pump body 100 can therefore be suppressed.

The disc spring 210 is configured such that a bottom face side thereof (a side on which a load acts on an outer peripheral portion thereof) faces the rotary pumps 10 and 13, and a top face side thereof (a side on which a load acts on an inner peripheral portion thereof) faces the motor 11.

The first to fourth cylinders 71a to 71d include first, second, third, and fourth center holes 72a, 72b, 72c, and 72d, respectively. A bearing 51 is installed to the inner periphery of the first center hole 72a formed on the first cylinder 71a. Another bearing 52 is installed to the inner periphery of the third center hole 72c formed on the third cylinder 71c. The bearings 51 and 52 include ball bearings which have narrower widths than needle bearings.

The bearings 51 and 52 have seal plates 51a and 52a, respectively. The seal plate 51a is positioned at an end of the bearing 51 closer to the head (i.e. the leading end of the insertion direction) of the drive shaft 54. The seal plate 52a is positioned at an end of the bearing 52 facing the fourth cylinder 71d.

Figure 3A:
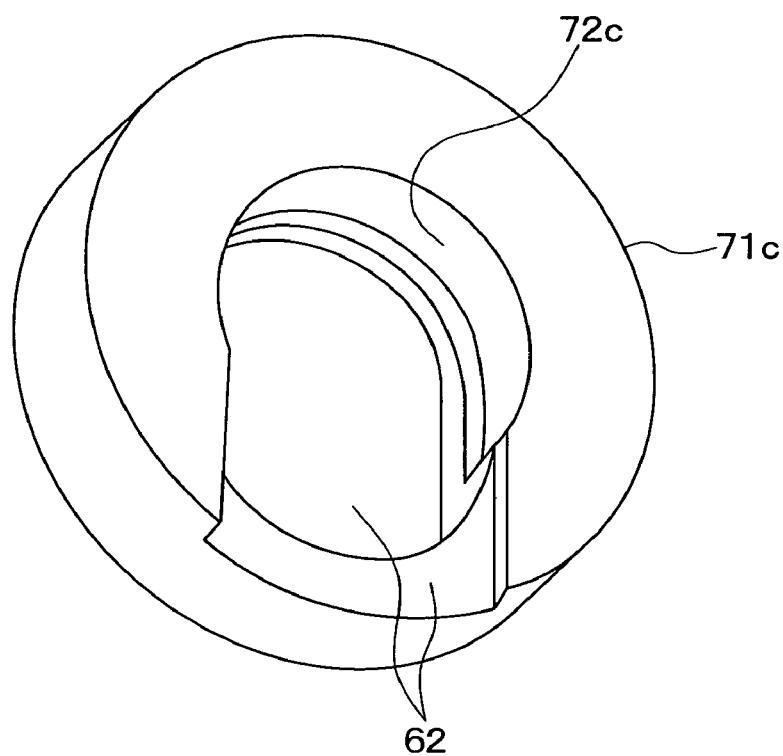
FIG. 3A is a perspective view of a cylinder in the pump body.
Figure 3B:
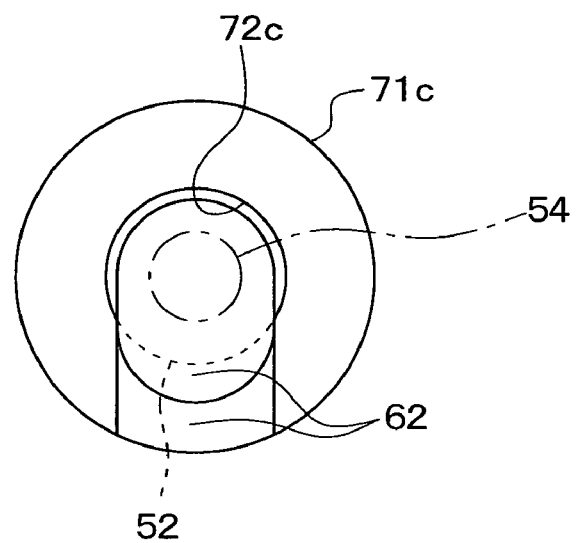
FIG. 3B is a schematic frontal view of the cylinder as seen from the axial direction of the pump body.

As shown in FIGS. 3A and 3B, the third center hole 72c has a portion whose inner diameter is equal to the outer diameter of the bearing 52 and another portion whose diameter is smaller than the outer diameter of the bearing 52. These portions form a stepped portion. When the bearing 52 is pushed to meet the stepped portion, the bearing 52 fits in the inner side of the third center hole 72c and a cavity remains on the fourth cylinder 71d side of the third center hole 72c. A portion of the fourth cylinder 71d is inserted in this cavity.

The drive shaft 54 is inserted through the first to fourth center holes 72a to 72d, and is axially supported by the bearings 51 and 52. Thus, the bearings 51 and 52 are disposed so that the rotary pumps 10 and 13 are arranged between them.

The third cylinder 71c also forms an intake port 62, which will be described later in detail.

Figure 4:
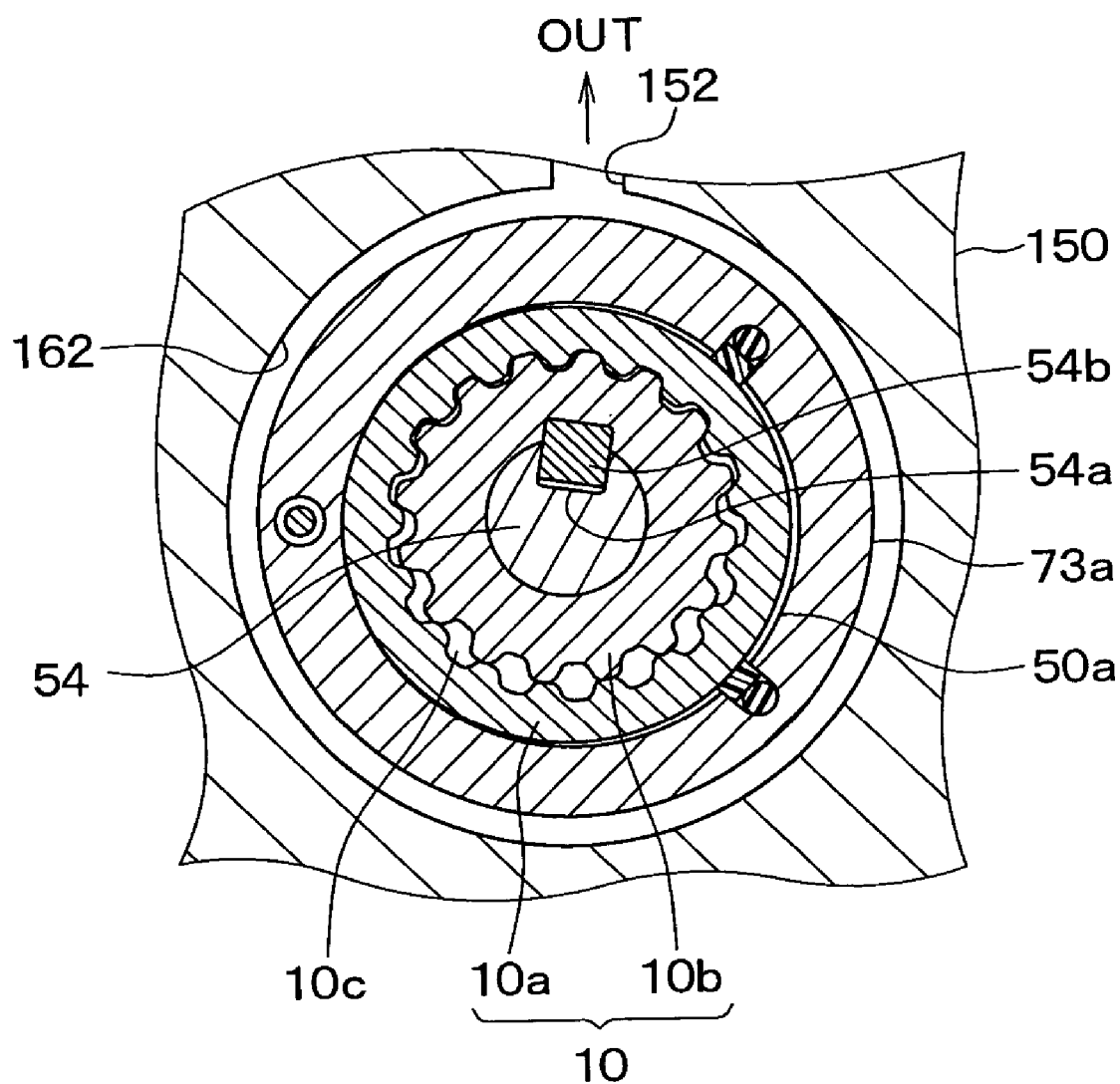
FIG. 4 is a cross-sectional view taken along the line IV-IV in FIG. 2.

Hereinafter, the structure of the rotary pumps 10 and 13 will be described with reference to FIGS. 2 and 4.

A rotor chamber 50a is formed by locating the cylindrical first center plate 73a between the first cylinder 71a and the second cylinder 71b. The rotary pump 10 is disposed within the rotor chamber 50a, and is configured as an internal gear pump (a trochoid pump) that is driven by the drive shaft 54.

More specifically, the rotary pump 10 includes a rotating portion having an outer rotor 10a and an inner rotor 10b. An internal teeth portion is formed on the inner periphery of the outer rotor 10a. An external teeth portion is formed on the outer periphery of the inner rotor 10b. The drive shaft 54 is inserted through a hole in the inner rotor 10b. A key 54b fits in an oval hole 54a (see FIG. 2) formed on the drive shaft 54. Torque is transmitted from the drive shaft 54 to the inner rotor 10b through the key 54b.

The internal teeth portion and the external teeth portion, which are formed on the outer rotor 10a and the inner rotor 10b, respectively, mesh to form a plurality of gap portions 10c. The rotary pump 10 draws in and discharges the brake fluid as the sizes of the gap portions 10c vary in accordance with rotation of the drive shaft 54.

A rotor chamber 50b is formed by locating the cylindrical second center plate 73b between the second cylinder 71b and the third cylinder 71c. The rotary pump 13 is disposed within the rotor chamber 50b. As well as the rotary pump 10, the rotary pump 13 is configured as an internal gear pump having an outer rotor 13a and an inner rotor 13b. The rotary pump 13 is disposed so as to rotate 180 degrees around the drive shaft 54 relative to the rotary pump 10. With such an arrangement, some of the gap portions 10c on the intake side of the rotary pump 10 and some of gap portions on the intake side of the rotary pump 13 are located symmetrically with respect to the drive shaft 54. Likewise, some of the gap portions 10c on the discharge side of the rotary pump 10 and some of gap portions on the discharge side of the rotary pump 13 are located symmetrically with respect to the drive shaft 54. Therefore, forces acting on the drive shaft 54 caused by the high brake hydraulic pressure on the discharge sides are canceled by each other.

The first cylinder 71a includes an intake port 60 which is in communication with some of the gap portions 10c on the intake side of the rotary pump 10. The intake port 60 is formed so as to run from an end surface on the rotary pump 10 side of the first cylinder 71a to the opposite end surface of the first cylinder 71a. Therefore, the brake fluid is introduced from the opposite end face.

The intake port 60 is also connected with an intake passage 151, which is formed in the housing 150 so as to run from an outer surface of the housing 150 to the bottom face of the concave portion 150a.

The second cylinder 71b includes a discharge port 61 which is in communication with some of the gap portions 10c on the discharge side of the rotary pump 10. The discharge port 61 extends from an end surface covering the rotating portion of the rotary pump 10 to an outer periphery of the rotary pump 10. More specifically, the discharge port 61 has a structure as described below.

An end surface of the second cylinder 71b facing the rotating portion of the rotary pump 10 has a circular groove (a first circular groove) 61a, which is formed so as to surround the drive shaft 54.

A ring-shaped seal member 171 is located within the circular groove 61a. The seal member 171 includes a resin member 171a and a rubber member 171b. The resin member 171a is located facing closer to the rotating member than the rubber member 171b is. The rubber member 171b presses the resin member 171a toward the rotating member. A region within the ring shape of the seal member 171 includes some of the gap portions 10c at the intake side and a clearance between the first center plate 73a and a part of the outer periphery of the outer rotor 10a, the part corresponding to some of the gap portions 10c on the intake side. Another region out of the ring shape of the seal member 171 includes some the gap portions 10c on the discharge side and a clearance between the first center plate 73a and a part of the outer periphery of the outer rotor 10a, the part corresponding to the gap portions 10c on the discharge side. Thus, relatively low-pressure region and a relatively high-pressure region on the inner and outer peripheries of the seal member 171 are separated from each other and sealed by the seal member 171.

In addition, the seal member 171 contacts the radially inner periphery of the circular groove 61a, and partially contacts the radially outer periphery of the circular groove 61a. A clearance is formed by a portion of the circular groove 61a which is closer to the radially outer periphery than the seal member 171 and is not in contact with the seal member 171. The brake fluid can flow into the clearance. On the second cylinder 71b, a passage 61b extends from a portion of the circular groove 61a. The discharge port 61 is thus formed by the clearance of the circular groove 61a configured as described above and the-passage 61b.

The discharge port 61 is also connected with a discharge passage 152 that is formed in the housing 150. This connection is achieved via a circular groove 162, which is formed on a part of the concave portion 150a, the part being in the vicinity of the leading end of the pump body 100 in the insertion direction and surrounding the entire circumferential surface of a portion of the pump body 100.

In addition, the second cylinder 71b includes a discharge port 63, which is located on an end surface of the second cylinder opposite to the end surface at which the discharge port 61 is formed. The discharge port 63 is in communication with a gap portion at the discharge side of the rotary pump 13.

The discharge port 63 extends from the above mentioned opposite end surface of the second cylinder 71b to an outer periphery of the second cylinder 71b. The discharge port 63 has a structure substantially identical to the discharge port 61. The discharge port 63 includes a clearance of a circular groove 63a within which a ring-shaped seal member 172 having a resin member 172a and a rubber member 172b is located. The discharge port 63 also includes a passage 63b that extends from the highest position of the circular groove 63a. The discharge port 63 is also connected with a discharge passage 154. This connection is achieved via a circular groove 163, which is formed on a part of the concave portion 150a, the part surrounding the entire circumference of the center plate 73b.

The third cylinder 71c has an intake port 62 that is in communication with the gap portions on the intake side of the rotary pump 13.

The intake port 62 penetrates the third cylinder 71c starting from the end surface on the rotary pump 13 side of the third cylinder 71c to the end surface on the opposite side thereof. The intake port 62 runs from the end surface on the above mentioned opposite side to the outer peripheral surface of the third cylinder 71c.

More specifically, the intake port 62 is formed by the third center hole 72c of the third cylinder 71c. The diameter of the third center hole 72c is enlarged and a groove is hence formed at a portion on the third center hole 72c. As shown in FIGS. 3A and 3B, the third center hole 72c of the third cylinder 71c has an oval (or elongated) shape on the rotary pump 13 side (a deeper side in FIG. 3A). The drive shaft 54 is located so that an upper profile of the cross section thereof is in parallel with a semicircle of a top end portion of the oval shape. The diameter of a semicircle of a bottom end portion of the oval shape is partially further enlarged than the diameter of the drive shaft 54. The enlarged portion has a diameter larger than that of the outer periphery of the bearing 52. The bottom end portion of the oval shape may be replaced with a rectangular shape.

The third center hole 72c is enlarged at an intermediate position in the axial direction of the third cylinder 71c so as to have a diameter equal to that of the bearing 52. The bottom end portion of the oval shape is connected with a groove that extends to the outer peripheral surface of the third cylinder 71c. The connection is made at an end surface on the side of the third cylinder 71c opposite to the rotary pump 13 side thereof. This groove may have a cross-section with a rectangular shape or a semi-oval shape, although it has the cross section with the rectangular shape in the present embodiment.

The intake port 62 includes a crescent-shaped portion which is not occupied by the bearing 52. The intake port 62 also includes the groove which is formed on the end surface of the third cylinder 71c opposite to the rotary pump 13 side thereof. The groove extends to the outer peripheral surface of the third cylinder 71c. The brake fluid is therefore introduced from the outer peripheral surface of the third cylinder 71c, which serves as an inlet. The intake port 62 is connected with an intake passage 153 that is formed in the housing 150. This connection is achieved via a circular groove 164, which is formed on a part of the concave portion 150a, the part surrounding the entire circumference of a portion of the pump body 100, the portion including the inlet of the intake port 62.

The intake passage 153 and the discharge passage 154 shown in FIG. 2 correspond respectively to the conduit C2 and C1 in FIG. 1.

Since the third center hole 72c is used as a part of the intake port 62, the brake fluid is delivered to the drive shaft 54, the bearing 52 and the like. This in turn allows smooth rotation of the drive shaft 54. In addition, the intake port 62 is positioned closer to the motor 11 (or, closer to an exterior of the housing 150) than the discharge port 63 is. Therefore, the brake hydraulic pressure at a portion in the vicinity of the discharge port 63 is suppressed.

The second center hole 72b of the second cylinder 71b has a portion whose diameter is larger than that of the drive shaft 54. In this enlarged-diameter portion, a seal member 80 is located and separates the first rotary pump 10 from the second rotary pump 13. The seal member 80 includes a ring-shaped elastic member (hereinafter referred to as an O-ring 81) and a ring-shaped resin member 82. The resin member 82 includes a groove portion which is dug in the radial direction of the resin member 82. The O-ring 81 fits in the resin member (more specifically, in the groove portion.) The elastic force of the O-ring 81 presses the resin member 82 into contact with the drive shaft 54.

The resin member 82 and the second center hole 72b of the second cylinder 71b similarly have substantially D-shaped cross sections (not shown) in which an end of a round shape is cut off and an arc and a string are formed. The resin member 82 also fits in the second center hole 72b of the second cylinder 71b. Therefore, cut-off portions of the resin member 82 serves as a key to prohibit the seal member 80 from rotating relative to the second cylinder 71b.

The fourth cylinder 71d is concave at a surface opposite to the surface on which the disc spring 210 is located. The drive shaft 54 projects from this concaved portion. The drive shaft 54 has a key-shaped connective portion 54c on an end surface of the projecting portion. The connective portion 54c is inserted into a drive shaft 11a of the motor 11. Accordingly, the single drive shaft 54 is rotated by the motor 11 via the drive shaft 11a, in turn the rotary pumps 10 and 13 are driven.

Additionally, a diameter of an inlet on the concaved portion of the fourth cylinder 71d is equal to that of a hole 11c, which is formed on a holder 11b of the motor 11. A clearance between the concaved portion of the fourth cylinder 71d and the hole 11c is minimized and a bearing 180 is located in them so as to axially support the drive shaft 11a. Although the drive shaft 11a is axially supported by the bearing 180, the drive shaft 54 may be axially supported in place of the drive shaft 11a.

As described above, the bearing 180 is located on the hole 11c of the holder 11b and the concaved portion of the fourth cylinder 71d. The motor 11 and the fourth cylinder 71d are therefore properly positioned and axial misalignment of the drive shaft 11a and the drive shaft 54 can be minimized.

A seal member 90 and an oil seal 91 are aligned in the axial direction of the drive shaft 54 and are inserted and fixed in the concaved portion of the fourth cylinder 71d in such a manner that the seal member 90 and the oil seal 91 cover an outer periphery of the drive shaft 54. The seal member 90 has a structure identical to the seal member 80 and seals the brake fluid which leaks from the intake port 62. The oil seal 91 serves as a seal for sealing the interior of the pump body 100 from the exterior thereof.

In addition, O-rings 74a, 74b, 74c, and 74d are disposed circumferentially on the outer peripheral surfaces of the first to fourth cylinders 71a to 71d, respectively. The O-rings 74a to 74d seal the brake fluid in the intake passages 151, 153 and the discharge passages 152, 154, which are formed in the housing 150. The O-rings 74a to 74d are respectively disposed between the intake passage 151 and the discharge passage 152, between the discharge passage 152 and the discharge passage 154, between the discharge passage 154 and the intake passage 153, and between the intake passage 153 and the housing 150. In FIG. 3A, a groove which the O-ring 74c fits in is not shown for convenience of illustration.

A diameter of the radially outer periphery of the fourth cylinder 71d is reduced at the inlet-side edge of the concaved portion of the fourth cylinder 71d. A stepped portion is therefore formed on the outer periphery of the fourth cylinder 71d. This reduced-diameter portion fits in the ring-shaped external thread member 200 described above so that the pump body 100 is fixed.

A description will be given of the operation of the brake device and the pump body 100.

The brake device drives the pump body 100 to draw in the brake fluid in the reservoir 40 and discharge the brake fluid in occasions including the first one when the vehicle wheel exhibits a lock tendency and ABS control accordingly operates, and the second one when a large braking force is required. The second occasion may occur, for example, when a braking force to match the brake pedaling force cannot be obtained, or when the brake pedal 1 has been operated a large amount. The discharged brake fluid increases the pressure of the wheel cylinders 4 and 5.

In these occasions, the pump body 100 performs basic pump operation where the rotary pumps 10 and 13 draw in the brake fluid through the intake passages 151 and 153, respectively, and discharge brake fluid through the discharge passages 152 and 154, respectively.

During the basic pump operation, the brake hydraulic pressures at discharge-side of the rotary pumps 10 and 13 become extremely large. Therefore, the brake fluid applies a force in a direction in which the pump body 100 gets out of the housing 150. However, as explained above, the axial force of the pump body 100 is secured by the disc spring 210 and the external thread member 200. Therefore, the pump body 100 is kept from wobbling in the housing 150.

In the present embodiment, a cylinder portion which forms the contour of the pump body 100 is constructed by more than one component. More specifically, the pump body 100 is divided, at a place between the rotary pump 10 and the motor 11, into two components, that is, the third cylinder 71c and the fourth cylinder 71d. In addition, the disc spring 210 is located between the third cylinder 71c and the fourth cylinder 71d.

Figure 5:
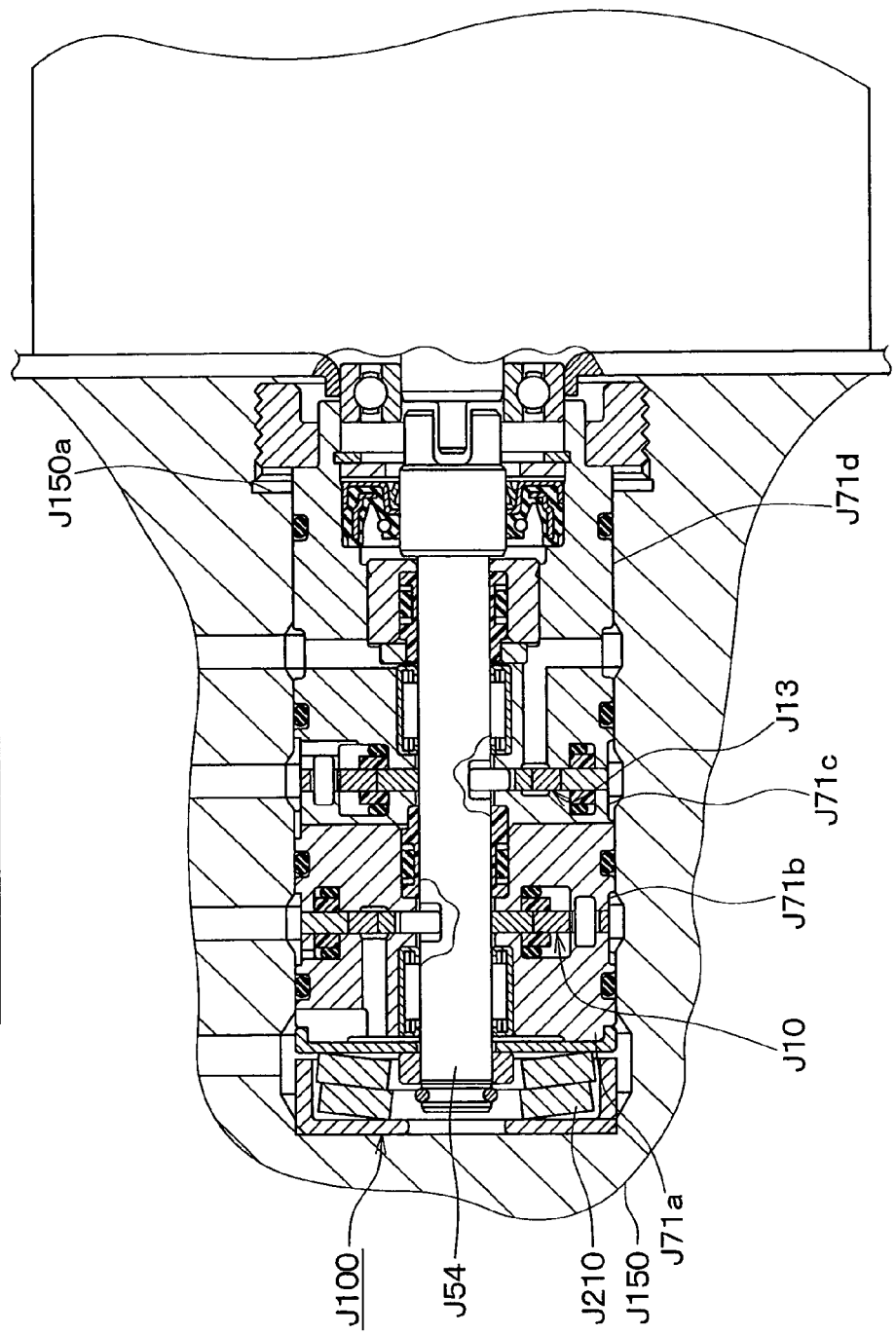
FIG. 5 is a cross-sectional view of a pump body in a conventional vehicular brake device.

In a conventional vehicular brake device shown in FIG. 5, a cylinder portion which forms the contour of a pump body is composed of a single component between a rotary pump and a motor and has an intake port. Since a bearing and a seal must be disposed in the cylinder portion, the cylinder portion with the conventional structure inevitably has a considerable axial length. However, nothing is provided at regions which are closer to the outer periphery of the pump body than the bearing or seal is. The regions thus become dead space.

In contrast, the disc spring 210 is located between the third cylinder 71c and the fourth cylinder 71d in the present embodiment. Therefore, space can be effectively utilized. A total axial length (pump shaft length) of the pump body 100, including the third cylinder 71c, the fourth cylinder 71d, and the disc spring 210, can thus be shortened compared to a pump body in which the disc spring 210 is located at an end position of the pump body 100.

The disc spring 210 is configured such that a bottom surface thereof (a side on which a load acts on an outer peripheral portion) faces the rotary pumps 10 and 13 and a top surface side thereof (a side on which a load acts on an inner peripheral portion) faces the motor 11 side.

If the top surface of the disc spring 210 faced the rotary pumps 10 and 13 and the bottom surface of the disc spring 210 faced the motor 11 side, then the following problems might occur.

A reaction force or the like which is generated when the pump body 100 is pressed against the bottom surface of the concave portion 150a is transmitted to the disc spring 210, via the outer peripheral portion of the first cylinder 71a, the first center plate 73a, the outer peripheral portion of the second cylinder 71b, the second center plate 73b, and the outer peripheral portion of the third cylinder 71c. At that time, such a load must be borne by the top surface of the disc spring 210. In this case, the load acts on the outer peripheral side of the third cylinder 71c while the load is actually borne at a position closer to the inner peripheral side of the third cylinder 71c. As a consequence, this displacement could deform the third cylinder 71c.

In the present embodiment, however, the load can be borne by the bottom surface of the disc spring 210, that is, the outer peripheral side of the third cylinder 71c. Therefore, the load can be reliably borne at the bottom surface of the disc spring 210, and deformation of the third cylinder 71c is suppressed.

In addition, the third cylinder 71c has, as shown in FIG. 3, a simple shape in which only the third center hole 72 is formed on a cylinder-like member. Therefore, the third cylinder 71c can be formed only by simple plastic working. There is no need to form the intake port 62 by drilling from the outer periphery of the third cylinder 71c.

As can be seen in the conventional pump body, the intake port includes two oil passages which run separately from an axial end and a radial periphery of the cylinder and orthogonally meet with each other at their ends. Consequently, burrs which have to be removed are created at portions where the oil passages meet. In the present embodiment such removal operation are not required.

Likewise, the fourth cylinder 71d also has a simple shape in which only the center hole 72d is formed on a cylinder-like member. Therefore, the fourth cylinder 71d can be formed only by simple plastic working.

Since it is possible to avoid the burrs as well as to configure easily the third and fourth cylinders 71c and 71d, it is also possible to avoid various problems resulting from the burrs mixing into the brake fluid.

Furthermore, according to the present embodiment, the bearings 51 and 52 are configured by ball bearings. It is therefore possible to reduce the size of the pump body 100 in the axial direction compared to a pump body using needle bearings.

The present invention should not be limited to the embodiment discussed above and shown in the figures, but may be implemented in various ways without departing from the spirit of the invention.

For example, the drive shaft 54 may be disposed in contact with a semicircle of a top end portion of the oval shape formed on the center hole 72c.

According to the above embodiment, the pump body 100 is fixed to the housing 150 by screwing the external thread member 200 to the internal thread groove 150b, which is formed in the concave portion 150a of the housing 150. However, the pump body 100 may be fixed by other methods such as caulking of the inner peripheral face of the concave portion 150a.

Although the above embodiment describes an example using the two rotary pumps 10 and 13, more than two rotary pumps may also be used.

What is claimed is:

1. A vehicular brake device, comprising:
    a plurality of rotary pumps, each including:
        a rotating portion which includes an inner rotor having, on an outer periphery thereof, an external teeth portion and an outer rotor having, on an inner periphery thereof, an internal teeth portion, wherein the internal teeth portion and the external teeth portion meshes to form a plurality of gap portions;
        an intake port for introducing brake fluid to the rotating portion; and
        a discharge port for discharging brake fluid flowing out from the rotating portion;
    a pump body for housing a drive shaft and the plurality of rotary pumps and for driving by means of the drive shaft the inner rotors of the plurality of rotary pumps, the pump body including:
        a cylindrical first case for housing the plurality of-rotary pumps;
        a second case located coaxially with the first case; and
        a spring located between the first case and the second case;
    a housing having a concave portion to which the pump body is inserted with the first case closest to the leading end of the pump body in a direction of insertion; and
    a fixing means located at an entrance of the concave portion for pressing the second case in the direction of the insertion and for fixing the second case.

2. The vehicular brake device according to claim 1, wherein:
    the plurality of rotary pumps include a first rotary pump and a second rotary pump;
    the first case includes:
        a first cylinder on which a first hole is formed into which the drive shaft is inserted;
        a first plate located adjacent to the first cylinder, for housing the rotating portion of the first rotary pump;
        a second cylinder located adjacent to the first plate, on the second cylinder a second hole being formed into which the drive shaft is inserted;
        a second plate, located adjacent to the second cylinder, for housing the rotating portion of the second rotary pump; and
        a third cylinder located adjacent to the second plate, on the third cylinder a third hole being formed into which the drive shaft is inserted;
    the first cylinder, the first plate, the second cylinder, the second plate, and the third cylinder form an integrated unit;
    the second case includes a fourth cylinder, located adjacent to the third cylinder, on the fourth cylinder a fourth hole being formed into which the drive shaft is inserted; and
    the spring is located between the third cylinder and the fourth cylinder.

3. The vehicular brake device according to claim 2, wherein the spring is a disc spring.

4. The vehicular brake device according to claim 3, wherein:
    a first surface of the disc spring faces the first case and an outer periphery of the first surface serves as a portion for bearing a load applied from the first case; and
    a second surface of the disc spring faces the second case and an inner periphery of the second surface serves as a portion for bearing a load applied from the second case.

5. The vehicular brake device according to claim 3, wherein:

the fourth cylinder has, at a side thereof facing the third cylinder, a reduced-diameter portion having a diameter shorter than that of another portion of the fourth cylinder; and the disc spring is located at the reduced-diameter portion.

6. The vehicular brake device according to claim 5, wherein:

a portion of the third hole facing the fourth cylinder has an inner diameter which is equal to or slightly larger than the reduced-diameter portion of the fourth cylinder; and the reduced-diameter portion of the fourth cylinder can be inserted into the third hole.

7. The vehicular brake device according to claim 5, wherein:

a seal means is located at the reduced-diameter portion of the fourth cylinder and between the fourth hole and the drive shaft; and the disc spring is located on an outer peripheral side of a portion of the fourth cylinder where the seal means is located.

8. The vehicular brake device according to claim 1, wherein:

the fixing means includes a thread member which is screwed and fixed to an entrance of the concave portion and presses the second case in the direction of the insertion.

9. The vehicular brake device according to claim 1, wherein:

the first case includes a plurality of cylinder members for forming side plates of the plurality of rotary pumps;

one of the plurality of cylinder members closest to the second case is formed with an insertion hole into which the drive shaft is inserted;

the insertion hole is made at least partially larger in the radial direction thereof than a diameter of the drive shaft; and one of the intake ports for one of the rotary pumps closest to the second case is formed as a cavity between the drive shaft and the insertion hole.

10. The vehicular brake device according to claim 9, wherein:

a bearing for supporting the drive shaft is located in the insertion hole; and the closest intake port is constructed by an outer periphery of the bearing and a part of an inner wall of the insertion hole, the part elongated radially apart from an outer periphery of the bearing.

11. The vehicular brake device according to claim 9, wherein the closest intake port is formed by a groove at which the insertion hole has been partially enlarged into one of a rectangular shape and a semi-oval shape.

12. The vehicular brake device according to claim 9, wherein the closest intake port includes, at an end of the cylinder member closest to the second case, an oil passage which is in communication with an outer peripheral surface of the cylinder member.

13. The vehicular brake device according to claim 9, wherein the cylinder member is formed by plastic working.

14. The vehicular brake device according to claim 9, wherein:

the plurality of rotary pumps include a first rotary pump and a second rotary pump;

the first case includes:

a first cylinder on which a first hole is formed into which the drive shaft is inserted;

a first plate located adjacent to the first cylinder, for housing the rotating portion of the first rotary pump;

a second cylinder located adjacent to the first plate, on the second cylinder a second hole being formed into which the drive shaft is inserted;

a second plate, located adjacent to the second cylinder, for housing the rotating portion of the second rotary pump; and a third cylinder located adjacent to the second plate, on the third cylinder a third hole being formed into which the drive shaft is inserted;

the first, second, and third cylinders constitute the plurality of cylinder members;

the third cylinder is the closest cylinder;

the first cylinder, the first plate, the second cylinder, the second plate, and the third cylinder form an integrated unit; and the second case includes a fourth cylinder, located adjacent to the third cylinder, on the fourth cylinder a fourth hole being formed into which the drive shaft is inserted.

* * * * *